United States Patent
Tan (10) Patent No.: US 12,207,189 B2
(45) Date of Patent: Jan. 21, 2025

(54) FIRST ACCESS POINT, SECOND ACCESS POINT, METHOD PERFORMED BY WIRELESS NETWORK, AND STORAGE MEDIUM

(71) Applicant: TP-LINK CORPORATION LIMITED, Hong Kong (CN)

(72) Inventor: Jiajie Tan, Hong Kong (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/615,019

(22) Filed: Mar. 25, 2024

(65) Prior Publication Data

US 2024/0236848 A1    Jul. 11, 2024

Related U.S. Application Data

(63) Continuation of application No. PCT/CN2022/120932, filed on Sep. 23, 2022.

(30) Foreign Application Priority Data

Sep. 23, 2021   (CN) .......................... 202111112746.8

(51) Int. Cl.
  *H04W 52/02*   (2009.01)
  *H04W 52/24*   (2009.01)

(52) U.S. Cl.
  CPC ..... *H04W 52/0206* (2013.01); *H04W 52/243* (2013.01)

(58) Field of Classification Search
  CPC .................... H04W 52/0206; H04W 52/243
  USPC .......................................................... 370/311
  See application file for complete search history.

(56) References Cited

U.S. PATENT DOCUMENTS

2020/0396695 A1*  12/2020  Bhushan .............. H04B 17/336

FOREIGN PATENT DOCUMENTS

| CN | 103957585 A | 7/2014 |
|---|---|---|
| CN | 103068021 B | 4/2015 |
| CN | 105338588 A | 2/2016 |
| CN | 114007258 A | 2/2022 |
| TW | I632815 B | 8/2018 |

* cited by examiner

*Primary Examiner* — Gbemileke J Onamuti
(74) *Attorney, Agent, or Firm* — Loeb & Loeb LLP (57) ABSTRACT

The present disclosure discloses a first access point, a second access point, a method performed by a wireless network, and a storage medium. The first access point is one of constituent devices of a wireless network, and includes one or more processors configured to: select, in response to a degree of interference of the first access point satisfying a preset condition, a plurality of second access points adjacent to the first access point; determine the first access point and the plurality of second access points as constituent access points of a sub-network of the wireless network; and adjust, based on a first network performance parameter corresponding to at least one client connected to an access point of the sub-network and/or a second network performance parameter corresponding to at least one access point in the sub-network, a transmit power of the first access point.

19 Claims, 3 Drawing Sheets

FIRST ACCESS POINT, SECOND ACCESS POINT, METHOD PERFORMED BY WIRELESS NETWORK, AND STORAGE MEDIUM

CROSS-REFERENCE TO RELATED APPLICATION

This application is a continuation of International Patent Application No. PCT/CN2022/120932, filed on Sep. 23, 2022, which claims the priority to and benefits of Chinese Patent Application No. 202111112746.8 filed on Sep. 23, 2021. All the aforementioned patent applications are hereby incorporated by reference in their entireties.

TECHNICAL FIELD

The present disclosure relates to the technical field of wireless communication, and in particular to a first access point, a second access point, a method performed by a wireless network, and a storage medium.

BACKGROUND

In recent years, with the increasing number of mobile users and the amount of real-time multimedia data traffic, the users' need for wireless local area network (WLAN) in terms of bandwidth, performance, coverage, and so on is also increasing. In order to meet the users' needs, in hot spots with high density of users, it is often required to deploy APs with high density, that is, to build a wireless networking system. However, deploying APs with high density in hot spots with high density of users, due to high density of accesses, will lead to an aggravation of interference caused by the allocation of intra-frequency channels of multiple APs, and even an interruption of user communication.

In Wi-Fi 6, there have been some schemes of automatically adjusting transmit power by an AP, but it is still difficult for such schemes to solve the problem of aggravation of interference in the case of APs with high density. Therefore, it is necessary to further improve the current WLAN.

SUMMARY

The technical problem to be solved by the embodiments of the present disclosure is how to provide a method for adjusting transmit power of a wireless networking system, an apparatus, a device, a first access point, a second access point, a method performed by a wireless network, and a storage medium, so as to reduce the signal interference of the wireless networking system and improve the network performance of the wireless networking system.

In order to solve the above technical problem, in a first aspect, an embodiment of the present disclosure provides a method for adjusting transmit power of a wireless networking system, including:
  selecting, from among all APs, N first APs with greatest degrees of interference to constitute a first set of APs; where N>0;
  selecting, with each first AP of the first set of APs as the center, M second APs adjacent to the first AP to constitute a set of APs with power to be adjusted, forming N sets of APs with power to be adjusted, each of the sets of APs with power to be adjusted including M+1 APs with power to be adjusted; where M>0; optionally, M=2;
  acquiring a first network performance parameter of a client connected under each of the APs with power to be adjusted and a second network performance parameter of each of the APs with power to be adjusted;
  randomly selecting, for each of the APs with power to be adjusted, a transmit power adjustment strategy, and calculating a third network performance parameter of the client connected under the adjusted each of the APs with power to be adjusted and a fourth network performance parameter of the adjusted each of the APs with power to be adjusted; wherein the transmit power adjustment strategy includes increasing transmit power, reducing transmit power and keeping transmit power unchanged; and
  acquiring, according to the first network performance parameter, the second network performance parameter, the third network performance parameter and/or the fourth network performance parameter, the next transmit power adjustment strategy for each of the APs with power to be adjusted.

As an alternative, the acquiring, according to the first network performance parameter, the second network performance parameter, the third network performance parameter and/or the fourth network performance parameter, the next transmit power adjustment strategy for each of the APs with power to be adjusted specifically includes:
  acquiring, according to the third network performance parameter and the first network performance parameter, a first value of network performance improvement corresponding to each of the APs with power to be adjusted;
  acquiring, according to the fourth network performance parameter and the second network performance parameter, a second value of network performance improvement corresponding to each of the APs with power to be adjusted;
  acquiring, for each of the APs with power to be adjusted, a value of contribution by the AP to a network performance improvement of a sub-area corresponding to the set of APs which the AP is in according to the first value of network performance improvement and the second value of network performance improvement; and
  acquiring the next transmit power adjustment strategy for each of the APs with power to be adjusted according to the value of contribution.

As an alternative, the acquiring the next transmit power adjustment strategy for each of the APs with power to be adjusted according to the value of contribution specifically includes:
  setting, when the value of contribution is greater than a first threshold, the next transmit power adjustment strategy to be increasing transmit power, and acquiring, according to a difference between the value of contribution and the first threshold, an increased transmit power value;
  setting, when the value of contribution is less than a second threshold, the next transmit power adjustment strategy to be reducing transmit power, and acquiring, according to a difference between the second threshold and the value of contribution, a reduced transmit power value; wherein the second threshold is less than the first threshold; and
  setting, when the value of contribution is neither greater than the first threshold nor less than the second threshold, the next transmit power adjustment strategy to be keeping transmit power unchanged.

As an alternative, the first network performance parameter includes one or more of negotiation rate value, delay, packet loss rate and packet error rate;

the second network performance parameter includes one or more of negotiation rate value, delay, packet loss rate and packet error rate;

the third network performance parameter includes one or more of negotiation rate value, delay, packet loss rate and packet error rate; and the fourth network performance parameter includes one or more of negotiation rate value, delay, packet loss rate and packet error rate.

As an alternative, the selecting, from among all APs, N first APs with greatest degrees of interference to constitute a first set of APs specifically includes:

acquiring, between any two of the APs, a signal strength value of a signal received from a client, a noise floor, a channel utilization ratio and a signal strength value of a signal received from a neighbor access point;

determining, according to the signal strength value of the signal received from the client, the noise floor, the channel utilization ratio or the signal strength value of a signal received from a neighbor access point, a degree of interference of each of the APs, and ranking the APs according to the degrees of interference in an order from highest to lowest; and selecting, from among the ranked APs, the top N APs as the first APs.

As an alternative, after the forming N sets of APs with power to be adjusted, each of the sets of APs with power to be adjusted including M+1 APs with power to be adjusted, the method further includes:

reducing the transmit power of each of the APs with power to be adjusted in N of the sub-areas by a preset amplitude.

As an alternative, the preset amplitude is determined by the formula below:

$\Delta P = f(d) * (P_{max} - P_{min})$; where $\Delta P$ is the preset amplitude, $f(d)$ is an adjustment factor, $0 \leq f(d) \leq 1$, $P_{max}$ is the maximum transmit power for $AP$, and $P_{min}$ is the minimum transmit power for $AP$.

In order to solve the above technical problem, in a second aspect, an embodiment of the present disclosure provides an apparatus for adjusting transmit power of a wireless networking system, including:

a first selection module, configured to select, from among all APs, N first APs with greatest degrees of interference to constitute a first set of APs; where N>0;

a second selection module, configured to select, with each first AP of the first set of APs as the center, M second APs adjacent to the first AP to constitute a set of APs with power to be adjusted, forming N sets of APs with power to be adjusted, each of the sets of APs with power to be adjusted including M+1 APs with power to be adjusted; where M>0;

a first calculation module, configured to acquire a first network performance parameter of a client connected under each of the APs with power to be adjusted and a second network performance parameter of each of the APs with power to be adjusted;

a second calculation module, configured to randomly select, for each of the APs with power to be adjusted, a transmit power adjustment strategy, and calculate a third network performance parameter of the client connected under the adjusted each of the APs with power to be adjusted and a fourth network performance parameter of the adjusted each of the APs with power to be adjusted; wherein the transmit power adjustment strategy includes increasing transmit power, reducing transmit power and keeping transmit power unchanged; and a transmit power adjustment module, configured to acquire, according to the first network performance parameter, the second network performance parameter, the third network performance parameter and/or the fourth network performance parameter, the next transmit power adjustment strategy for each of the APs with power to be adjusted.

In order to solve the above technical problem, in a third aspect, an embodiment of the present disclosure provides a device for adjusting transmit power of a wireless networking system, including: a processor; and a memory; wherein, the memory stores a computer program which, is configured to be executed by the processor, and which, when executed by the processor, implements the method for adjusting transmit power of a wireless networking system according to any of the first aspect.

In order to solve the above technical problem, in a fourth aspect, an embodiment of the present disclosure provides a computer-readable storage medium having stored therein a computer program which, when executed, implements the method for adjusting transmit power of a wireless networking system according to any of the first aspect.

In order to solve the above technical problem, in a fifth aspect, an embodiment of the present disclosure provides a first access point (AP), which is one of constituent devices of a wireless network, and includes one or more processors configured to: select, in response to a degree of interference of the first access point satisfying a preset condition, a plurality of second access points adjacent to the first access point; determine the first access point and the plurality of second access points as constituent access points of a sub-network of the wireless network; and adjust, based on a first network performance parameter corresponding to at least one client connected to an access point of the sub-network and/or a second network performance parameter corresponding to at least one access point in the sub-network, a transmit power of the first access point.

As an alternative, the preset condition is that among all of the constituent access points of the wireless network, the first access point is one of the top N access points with highest degrees of interference, where N>0.

As an alternative, the degree of interference of the first access point is determined by a signal strength value of a signal received by the first access point from a client, a noise floor, a channel utilization ratio, and a signal strength value of a signal received from a neighbor access point.

As an alternative, the first access point further includes: a transmitter, configured to send, to the plurality of second access points, a power adjustment instruction instructing the plurality of second access points to adjust transmit power.

As an alternative, the adjusting of the transmit power of the first access point includes: acquiring, after adjusting the transmit power of the first access point, a third network performance parameter corresponding to at least one client connected to an access point of the sub-network and/or a fourth network performance parameter corresponding to at least one access point in the sub-network; and re-adjusting, based on the third network performance parameter and/or the fourth network performance parameter, the transmit power of the first access point.

As an alternative, the adjusting of the transmit power of the first access point includes: reducing, in response to the first access point sending a data packet in a wireless high-rate mode, the transmit power with which the first access point sends the data packet; and maintaining, in response to the first access point sending a data packet in a wireless low-rate mode, the transmit power with which the first access point sends the data packet.

As an alternative, the adjusting of the transmit power of the first access point includes: randomly adjusting the transmit power of the first access point, the randomly adjusting including: increasing the transmit power of the first access point, reducing the transmit power of the first access point, and maintaining the transmit power of the first access point.

As an alternative, the re-adjusting, based on the third network performance parameter and/or the fourth network performance parameter, the transmit power of the first access point includes: determining, based on the first network performance parameter and the third network performance parameter, a first network performance comparison value; and/or determining, based on the second network performance parameter and the fourth network performance parameter, a second network performance comparison value; and determining, based on the first network performance comparison value and/or the second network performance comparison value, a value of contribution by a transmit power adjustment of the first access point to a network performance improvement of the sub-network, and re-adjusting, based on the value of contribution, the transmit power of the first access point.

As an alternative, the re-adjusting, based on the value of contribution, the transmit power of the first access point includes: increasing, in response to the value of contribution being greater than a first threshold, the transmit power of the first access point based on a difference between the value of contribution and the first threshold; reducing, in response to the value of contribution being less than a second threshold, the transmit power of the first access point based on a difference between the value of contribution and the second threshold, wherein the second threshold is less than the first threshold; and maintaining, in response to the value of contribution being neither greater than the first threshold nor less than the second threshold, the transmit power of the first access point.

In order to solve the above technical problem, in a sixth aspect, an embodiment of the present disclosure provides a first access point (AP), which, together with a plurality of second access points, constitutes a sub-network of a wireless network, and includes one or more processors configured to: randomly adjust, based on a first network performance parameter corresponding to at least one client connected to an access point of the sub-network and/or a second network performance parameter corresponding to at least one access point in the sub-network, a transmit power of the first access point; acquire, after adjusting the transmit power of the first access point, a third network performance parameter corresponding to at least one client connected to an access point of the sub-network and/or a fourth network performance parameter corresponding to at least one access point in the sub-network; and re-adjust, based on the third network performance parameter and/or the fourth network performance parameter, the transmit power of the first access point.

As an alternative, the re-adjusting, based on the third network performance parameter and/or the fourth network performance parameter, the transmit power of the first access point includes: determining, based on the first network performance parameter and the third network performance parameter, a first network performance comparison value; and/or determining, based on the second network performance parameter and the fourth network performance parameter, a second network performance comparison value; and determining, based on the first network performance comparison value and/or the second network performance comparison value, a value of contribution by a transmit power adjustment of the first access point to a network performance improvement of the sub-network, and re-adjusting, based on the value of contribution, the transmit power of the first access point.

As an alternative, the re-adjusting, based on the value of contribution, the transmit power of the first access point includes: increasing, in response to the value of contribution being greater than a first threshold, the transmit power of the first access point based on a difference between the value of contribution and the first threshold; reducing, in response to the value of contribution being less than a second threshold, the transmit power of the first access point based on a difference between the value of contribution and the second threshold, wherein the second threshold is less than the first threshold; and maintaining, in response to the value of contribution being neither greater than the first threshold nor less than the second threshold, the transmit power of the first access point.

In order to solve the above technical problem, in a seventh aspect, an embodiment of the present disclosure provides a method performed by a wireless network, including:
selecting, from among all of APs constituting the wireless network, N first APs with greatest degrees of interference to constitute a first set of APs; where N>0; selecting, with each first AP of the first set of APs as the center, M second APs adjacent to the first AP to form N sub-networks, each of which includes one first AP and M second APs; where M>0; acquiring, for one of the N sub-networks, a first network performance parameter corresponding to a client connected to an AP in the sub-network and/or a second network performance parameter corresponding to the AP in the sub-network; randomly selecting a transmit power adjustment strategy corresponding to the AP in the sub-network, and adjusting, based on the transmit power adjustment strategy, a transmit power corresponding to the AP in the sub-network, wherein the transmit power adjustment strategy includes increasing transmit power, reducing transmit power and keeping transmit power unchanged; calculating a third network performance parameter of the client connected with the adjusted AP in the sub-network and a fourth network performance parameter corresponding to the adjusted AP in the sub-network; and acquiring, according to the first network performance parameter, the second network performance parameter, the third network performance parameter and/or the fourth network performance parameter, the next transmit power adjustment strategy for the AP in the sub-network.

As an alternative, the acquiring, according to the first network performance parameter, the second network performance parameter, the third network performance parameter and/or the fourth network performance parameter, the next transmit power adjustment strategy for the AP in the sub-network includes: acquiring, according to the third network performance parameter and the first network performance parameter, a first value of network performance improvement of an AP in each of the sub-networks; and/or acquiring, according to the fourth network performance parameter and the second network performance parameter, a second value of network performance improvement of the sub-network; acquiring, according to the first value of network performance improvement and/or the second value of network performance improvement, a value of contribution by the AP in the sub-network to a network performance improvement of the sub-network; and acquiring, according to the value of contribution, the next transmit power adjustment strategy for the AP in the sub-network.

As an alternative, the acquiring the next transmit power adjustment strategy for the AP in the sub-network according to the value of contribution includes: setting, when the value of contribution is greater than a first threshold, the next transmit power adjustment strategy to be increasing transmit power, and acquiring, according to a difference between the value of contribution and the first threshold, an increased transmit power value; setting, when the value of contribution is less than a second threshold, the next transmit power adjustment strategy to be reducing transmit power, and acquiring, according to a difference between the second threshold and the value of contribution, a reduced transmit power value; wherein the second threshold is less than the first threshold; and setting, when the value of contribution is neither greater than the first threshold nor less than the second threshold, the next transmit power adjustment strategy to be keeping transmit power unchanged.

As an alternative, the selecting, from among all APs, N first APs with greatest degrees of interference to constitute a first set of APs includes: acquiring, between any two of the APs, a signal strength value of a signal received from a client, a noise floor, a channel utilization ratio and a signal strength value of a signal received from a neighbor access point; determining, according to the signal strength value of the signal received from the client, the noise floor, the channel utilization ratio or the signal strength value of a signal received from a neighbor access point, a degree of interference of each of the APs, and ranking the APs according to the degrees of interference in an order from highest to lowest; and selecting, from among the ranked APs, the top N APs as the first APs.

As an alternative, after the forming N sub-networks, the method further includes: reducing transmit powers of APs in each of the N sub-networks by a preset amplitude.

$\Delta P = f(d)*(P_{max}-P_{min})$; where $\Delta P$ is the preset amplitude, $f(d)$ is an adjustment factor, $0 \leq f(d) \leq 1$, $P_{max}$ is the maximum transmit power for $AP$, and $P_{min}$ is the minimum transmit power for $AP$.

In order to solve the above technical problem, in an eighth aspect, an embodiment of the present disclosure provides a second access point (AP), which is one of constituent devices of a wireless network, and includes one or more processors configured to: determine, in response to a degree of interference of a first access point adjacent to the second access point satisfying a preset condition, that the second access point is an access point in a sub-network with the first access point as the center; and adjust, based on a first network performance parameter corresponding to at least one client connected to an access point of the sub-network and/or a second network performance parameter corresponding to at least one access point in the sub-network, a transmit power of the second access point.

As an alternative, the adjusting of the transmit power of the second access point includes: acquiring, after adjusting the transmit power of the second access point, a third network performance parameter corresponding to at least one client connected to an access point of the sub-network and/or a fourth network performance parameter corresponding to at least one access point in the sub-network; and re-adjusting, based on the third network performance parameter and/or the fourth network performance parameter, the transmit power of the second access point.

As an alternative, the re-adjusting, based on the third network performance parameter and/or the fourth network performance parameter, the transmit power of the first access point includes: determining, based on the first network performance parameter and the third network performance parameter, a first network performance comparison value; determining, based on the second network performance parameter and the fourth network performance parameter, a second network performance comparison value; and determining, based on the first network performance comparison value and/or the second network performance comparison value, a value of contribution by a transmit power adjustment of the first access point to a network performance improvement of the sub-network, and re-adjusting, based on the value of contribution, the transmit power of the second access point.

BRIEF DESCRIPTION OF DRAWINGS

In order to illustrate the technical features of the embodiments of the present disclosure more clearly, the drawings needed to be used in the embodiments of the present disclosure will be briefly introduced below. Obviously, the drawings described below are only some of the embodiments of the present disclosure. According to such drawings, other drawings can be obtained by those skilled in the art without paying creative labor.

DETAILED DESCRIPTION

In order to make a clearer understanding of the technical features, purposes and effects of the present disclosure, the specific implementations of the present disclosure will be further described in detail in conjunction with the drawings and the embodiments. The following embodiments are only used to illustrate the present disclosure, but not used to limit the protection scope of the present disclosure. Based on the embodiments of the present disclosure, other embodiments obtained by those skilled in the art without paying creative labor should belong to the protection scope of the present disclosure.

In the description of the present disclosure, it should be understood that the numbers themselves, such as "first" and "second", are herein only used to distinguish the described objects, without sequential or technical meaning, and thus cannot be understood as specifying or implying the importance of the described objects.

The main way to reduce signal interference in wireless networking systems is channel deployment and transmit power adjustment.

Among other things, a specific implementation of the channel deployment is to allocate suitable channels for wireless APs so as to minimize overall interference. However, due to the limitations of WLAN channels themselves, there can only be, in the 2.4G band, at most three channels with a bandwidth of 20 MHz that do not interfere with each other. When the number of APs is large and the distances among which are close, the intensity of the signal interference is still great.

A specific implementation of the transmit power adjustment is to select in the wireless networking system densely placed APs on which transmit power adjustment is to be performed, and the adjustment is based on a strength of signal of a neighboring AP received by a current AP, which is calculated to reduce the transmit power of all the wireless rate modes and all the wireless fidelity frames on the AP. However, in the case that the direction of AP power adjustment is determined only according to the placement of the Aps, when some of the APs are densely placed, but are connected to a very small number of clients, reducing the power of these APs will hardly improve the network performance, even with a risk of reducing the network performance. In contrast, when some of the APs are not placed in the densest AP group, but are connected to many clients, with a great interference on packet transmission among the APs, these APs should appropriately reduce the transmit power. According to the existing adjustment method, however, these APs maintain the transmit power unchanged, leading to no effects of improvement on the network performance.

The method for adjusting transmit power of a wireless networking system, the apparatus, the device, the first access point, the second access point, the method performed by the wireless network, and the storage medium provided by the embodiments of the present disclosure can reduce the signal interference of the wireless networking system and improve the network performance of the wireless networking system, and can have beneficial effects that: by firstly randomly adjusting transmit powers of APs whose signals are interfered, dynamically calculating, according to information of a client connected to APs within the wireless networking system, a degree of influence by each of the APs on the network performance of the area where it is located, and subsequently adjusting the transmit power according to the degree of influence, each of the APs in the wireless networking system is enabled to operate in a globally optimal state, thereby reducing the signal interference of the wireless networking system and improving the network performance of the wireless networking system.

Figure 1:
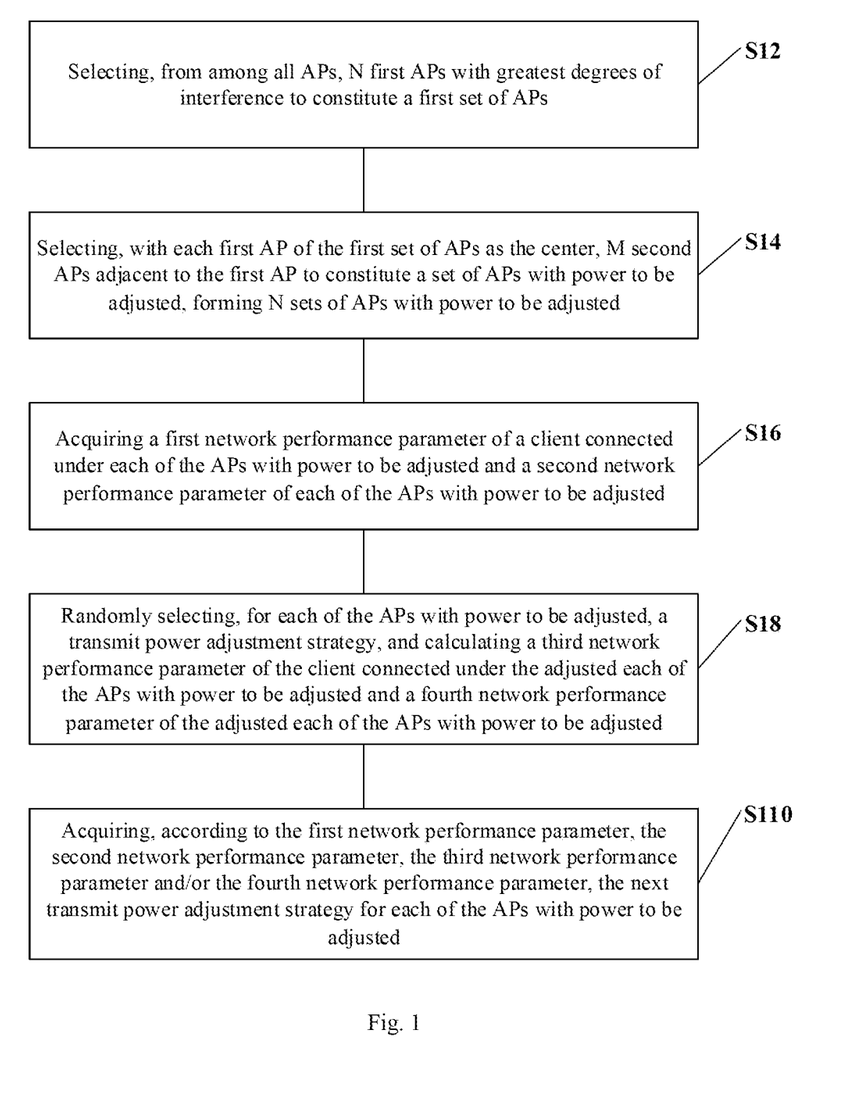
FIG. 1 is a flowchart of a preferred embodiment of a method for adjusting transmit power of a wireless networking system according to an embodiment of the present disclosure.

FIG. 1 is a flowchart of a preferred embodiment of a method for adjusting transmit power of a wireless networking system provided by the present disclosure.

As shown in FIG. 1, the method includes the following steps:

S12: selecting, from among all APs, N first APs with greatest degrees of interference to constitute a first set of APs; where N>0;

S14: selecting, with each first AP of the first set of APs as the center, M second APs adjacent to the first AP to constitute a set of APs with power to be adjusted, forming N sets of APs with power to be adjusted, each of the sets of APs with power to be adjusted including M+1 APs with power to be adjusted; where M>0;

S16: acquiring a first network performance parameter of a client connected under each of the APs with power to be adjusted and a second network performance parameter of each of the APs with power to be adjusted;

S18: randomly selecting, for each of the APs with power to be adjusted, a transmit power adjustment strategy, and calculating a third network performance parameter of the client connected under the adjusted each of the APs with power to be adjusted and a fourth network performance parameter of the adjusted each of the APs with power to be adjusted; wherein the transmit power adjustment strategy includes increasing transmit power, reducing transmit power and keeping transmit power unchanged;

S110: acquiring, according to the first network performance parameter, the second network performance parameter, the third network performance parameter and/or the fourth network performance parameter, the next transmit power adjustment strategy for each of the APs with power to be adjusted.

Specifically, firstly, a channel scanning instruction is sent by any network node (which may be a central manager or FAP, but is not limited to this) in the wireless networking system to each of the APs in the wireless networking system, and each of the APs returns scanning information of current channel (including a channel value and a signal strength value) to the network node which sent out the command. After receiving the scanning information, the network node selects therefrom N first APs with greatest degree of interference. Secondly, with each of the selected N first APs as the center, M second APs which are most adjacent to the center are selected, respectively, to constitute a set of APs with power to be adjusted (i.e., each of the sets of APs with power to be adjusted has 1+M APs, for which both the first AP and the second AP may be hereinafter referred to as APs with power to be adjusted), and correspondingly N sub-areas in this form are constituted, each of which corresponds to a set of APs with power to be adjusted. Then, for each of the APs with power to be adjusted in the selected N sub-areas, the first network performance parameters of the clients connected to such APs are acquired according to a preset time period, and the second network parameters of all of the APs with power to be adjusted of each of the sub-areas, both of which are used as parameters for subsequent comparison. Next, for each of the APs with power to be adjusted, the power adjustment strategy is randomly selected from increasing transmit power, reducing transmit power and keeping transmit power unchanged, and the third network performance parameters of the clients connected under the adjusted each of the APs with power to be adjusted and the fourth network performance parameters of the adjusted all of the APs in each of the sub-areas are calculated. Finally, according to the first network performance parameter, the second network performance parameter, the third network performance parameter and the fourth network performance parameter, a value of contribution by each of the APs to a network performance improvement in the area where it is located at is calculated, and the next transmit power adjustment strategy of each of the APs is obtained according to the value of contribution.

A method for adjusting transmit power of a wireless networking system provided by the embodiments of the present disclosure, by firstly randomly adjusting transmit powers of APs whose signals are interfered, dynamically calculating, according to information of a client connected to APs within the wireless networking system, a degree of influence by each of the APs on the network performance of the area where it is located, and subsequently adjusting the transmit power according to the degree of influence, enables each of the APs in the wireless networking system to operate in a globally optimal state, thereby reducing the signal interference of the wireless networking system and improving the network performance of the wireless networking system.

Figure 2:
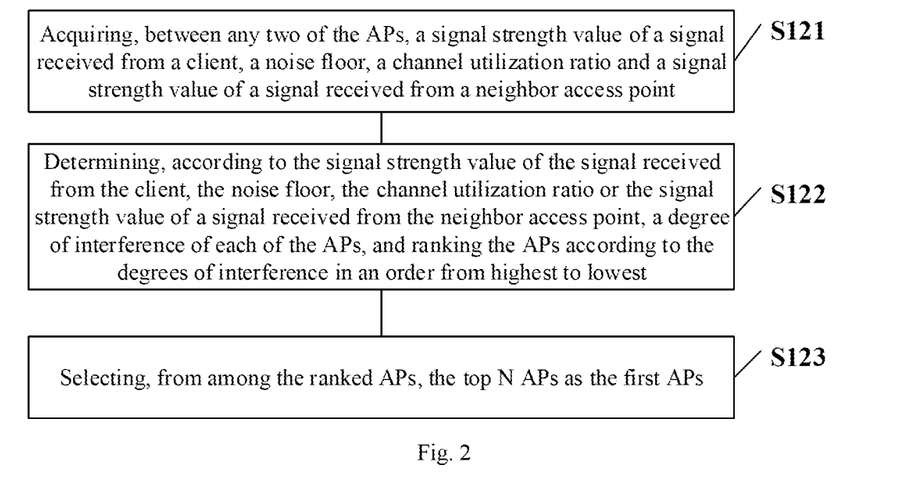
FIG. 2 is an example flowchart of an embodiment of step S12 in FIG. 1.

In a preferred embodiment, as shown in FIG. 2, the selecting, from among all APs, N first APs with greatest degrees of interference to constitute a first set of APs specifically includes:

S121: acquiring, from any two of the APs, a signal strength value of a signal received from a client, a noise floor, a channel utilization ratio and a signal strength value of a signal received from a neighbor access point; S122: determining, according to the signal strength value of the signal received from the client, the noise floor, the channel utilization ratio or the signal strength value of a signal received from the neighbor access point, a degree of interference of each of the APs, and ranking the APs according to the degrees of interference in an order from highest to lowest; S123: selecting, from among the ranked APs, the top N APs as the first APs.

Specifically, a channel scanning instruction is sent by any network node (which may be a central manager or FAP, but is not limited to this) in the wireless networking system to each of the APs in the wireless networking system, and each of the APs returns scanning information of current channel (including a channel value and a signal strength value) to the network node which sent out the command. As an example, the wireless networking system has X APs, and the scanning information of the current channel of the ith AP is a set of $\{RSSI_{i,1}, RSSI_{i,2}, \ldots, RSSI_{i,j}\}$, where j is a number of neighbors that can be scanned by the ith AP, then a degree of interference of the ith AP is calculated according to the formula as follows:

$$noise_i = \sum_j f(RSSI_{i,j})$$

and $noise_i$ is ranked from largest to smallest, and the AP with the largest noise value is considered as the AP with the greatest interference.

In a preferred embodiment, after the forming N sets of APs with power to be adjusted, each of the sets of APs with power to be adjusted including M+1 APs with power to be adjusted, the method further includes: S15: reducing the transmit power of each of the APs with power to be adjusted in N of the sub-areas by a preset amplitude.

Specifically, the transmit powers of respective wireless high-rate modes corresponding to all of the APs in the selected N sub-areas are adjusted downward by a preset amplitude, and the transmit powers of respective wireless low-rate modes of such APs are kept unchanged.

Among other things, the preset amplitude is determined by the formula below:

$\Delta P = f(d)*(P_{max} - P_{min})$; where $\Delta P$ is the preset amplitude, $f(d)$ is an adjustment factor, $0 \leq f(d) \leq 1$, $P_{max}$ is the maximum transmit power for AP, and $P_{min}$ is the minimum transmit power for AP.

Preferably, the value of f (d) is non-linearly variable, and varies according to the maximum transmit power and the minimum transmit power for AP, so that the adjusted power value is not at the edge at the beginning, which facilitates the iterative power adjustment process better.

This embodiment keeps the transmit power of the wireless low-rate mode of the AP unchanged and reduces only the transmit power of the wireless high-rate mode, which can not only improve the performance of the client in negotiation in the wireless high-rate mode, but also maintain the performance in negotiation in the wireless low-rate mode, guaranteeing unchanged original wireless coverage.

In a preferred embodiment, the transmit power adjustment strategy is identified as follows: +1 indicates increasing transmit power, −1 indicates reducing transmit power, and 0 indicates keeping transmit power unchanged.

Specifically, each of the APs would have a different wireless rate mode, and the value by which every time the power is increased or reduced needs to be calculated in correspondence to the respective wireless rate mode. Taking a wireless rate mode supporting MCS7 as an example, the value by which the power is increased or reduced, the corresponding resulting power value of which is nonlinear, can be characterized by the formula below: $d_i = f(P_{level})$.

A degree by which the power needs to be adjusted is calculated according to different power levels $P_{level}$, that is, the adjusted power value is: $P_i \leftarrow P_{0,i} - d_i$.

In a preferred embodiment, the first network performance parameter includes one or more of negotiation rate value, delay, packet loss rate and packet error rate; the second network performance parameter includes one or more of negotiation rate value, delay, packet loss rate and packet error rate; the third network performance parameter includes one or more of negotiation rate value, delay, packet loss rate and packet error rate; the fourth network performance parameter includes one or more of negotiation rate value, delay, packet loss rate and packet error rate.

Optionally, a network performance parameter may be any quantity that can be used to characterize the performance of the wireless network. Specifically, a network performance parameter may be characterized by negotiation rate value, IP packet transmission delay, change in IP packet delay, IP packet error rate, IP packet loss rate, IP packet error rate, etc. However, the network performance parameter in the present disclosure is not limited to this.

Figure 3:
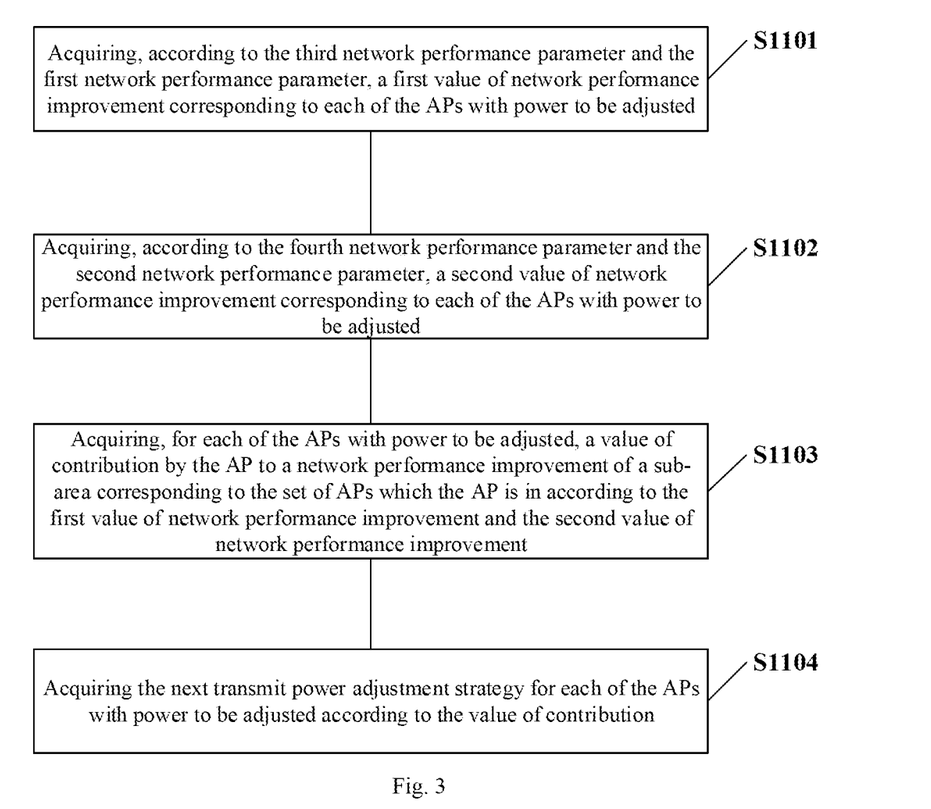
FIG. 3 is an example flowchart of a preferred embodiment of step S110 in FIG. 1.

In a preferred embodiment, as shown in FIG. 3, the acquiring, according to the first network performance parameter, the second network performance parameter, the third network performance parameter and/or the fourth network performance parameter, the next transmit power adjustment strategy for each of the APs with power to be adjusted includes: S1101: acquiring, according to the third network performance parameter and the first network performance parameter, a first value of network performance improvement corresponding to each of the APs with power to be adjusted; S1102: acquiring, according to the fourth network performance parameter and the second network performance parameter, a second value of network performance improvement corresponding to each of the APs with power to be adjusted; S1103: acquiring, for each of the APs with power to be adjusted, a value of contribution by the AP to a network performance improvement of a sub-area corresponding to the set of APs which the AP is in according to the first value of network performance improvement and the second value of network performance improvement; S1104: acquiring the next transmit power adjustment strategy for each of the APs with power to be adjusted according to the value of contribution.

As an example, this embodiment employs a negotiation rate value, a delay, a packet loss rate and a packet error rate to collectively characterize network performance parameters. In the last time period (before transmit power adjustment), corresponding to the client under the i-th AP with power to be adjusted, the negotiation rate is $ratei_{pre}$, the delay is $delayi_{pre}$, and the packet loss rate is $dropi_{pre}$; and in the current time period (after transmit power adjustment), correspondingly, the negotiation rate of the AP is $ratei_{cur}$, the delay is $delayi_{cur}$, and the packet loss rate is $dropi_{cur}$, then the first value of network performance improvement of the AP is $Ps=f(ratei_{pre}, ratei_{cur}, delayi_{pre}, delayi_{cur}, dropi_{pre}, dropi_{cur})$. In the previous time period, corresponding to all of the APs in the sub-area where the i-th AP with power to be adjusted is located at, the negotiation rate is $raten_{pre}$, the delay is $delayn_{pre}$, and the packet loss rate is $dropi_{pre}$; and in the current time period, corresponding to all of the APs in the sub-area, the negotiation rate is $raten_{cur}$, the delay is $delayn_{cur}$, and the packet loss rate is $dropn_{cur}$ then the second value of network performance improvement of the sub-area is $Pa=g(raten_{pre}, raten_{cur}, delayn_{pre}, delayn_{cur}, dropn_{pre}, dropni_{cur})$, where each of $raten_{pre}$, $delayn_{pre}$, $dropn_{pre}$, $raten_{cur}$, $delayn_{cur}$, and $dropn_{cur}$ is a set. Then, according to Ps and Pa, a value of contribution by the AP to the network performance improvement of the set of APs with power to be adjusted where the AP is in can be further calculated as $Q=h(Ps, Pa)$. Then, the next transmit power adjustment strategy of the AP with power to be adjusted is set to +1, or −1, or 0 according to the value of Q.

In a preferred embodiment, the acquiring the next transmit power adjustment strategy for each of the APs with power to be adjusted according to the value of contribution specifically includes: S11041: setting, when the value of contribution is greater than a first threshold, the next transmit power adjustment strategy to be increasing transmit power, and acquiring, according to a difference between the value of contribution and the first threshold, an increased transmit power value; S11042: setting, when the value of contribution is less than a second threshold, the next transmit power adjustment strategy to be reducing transmit power, and acquiring, according to a difference between the second threshold and the value of contribution, a reduced transmit power value; wherein the second threshold is less than the first threshold; S11043: setting, when the value of contribution is neither greater than the first threshold nor less than the second threshold, the next transmit power adjustment strategy to be keeping transmit power unchanged.

Specifically, the value of contribution may be graded, and the next transmit power adjustment strategy may be set according to its grade, which is characterized by the formula below:

$$T = \begin{cases} +1, & Q > \mu 1 \\ 0, & \mu 2 \leq Q \leq \mu 1, \\ -1, & Q < \mu 2 \end{cases}$$

where T represents the next transmit power adjustment strategy, µ1 is the first threshold, and µ2 is the second threshold.

Preferably, the method further includes S112: periodically optimizing and adjusting the transmit power of the AP.

Specifically, after each power adjustment, the network performance of the client is recorded, and according to this, the transmit power of the AP is optimized and adjusted in real time.

In a preferred embodiment, before step S11, the method further includes:
S10: selecting an AP for which power adjustment is to be performed.

Specifically, in the wireless networking system, there are APs whose power cannot be adjusted for special reasons, such as those APs preset by the system or selected by users whose powers don't need to be adjusted. So in the power adjustment, such APs will not be selected, but only the remaining whose powers are able to be adjusted will be adjusted, which can mitigate the impact of the power adjustment on the APs with special needs.

It should be understood that the whole or a part of the processes of the method for adjusting transmit power of a wireless networking system implemented in the present disclosure can also be accomplished by instructing related hardware through a computer program, which, can be stored in a computer-readable storage medium, and which, when executed by a processor, can implement the steps of the method for adjusting transmit power of a wireless networking system as described above. Among other things, the computer program includes computer program codes, which can be in the form of source code, object code, or executable file, or in a certain intermediate form. The computer-readable medium may include: any entity or apparatus capable of carrying the computer program codes, recording medium, U disk, mobile hard disk, magnetic disk, optical disc, computer memory, Read-Only Memory (ROM), Random Access Memory (RAM), electric carrier signal, telecommunication signal, software distribution medium, etc. It should be noted that the contents contained in the computer-readable media can be appropriately increased or decreased according to the requirements of legislation and patent practice within the jurisdiction. For example, in certain jurisdictions, according to legislation and patent practice, the computer-readable media does not include electric carrier signals and telecommunication signals.

Figure 4:
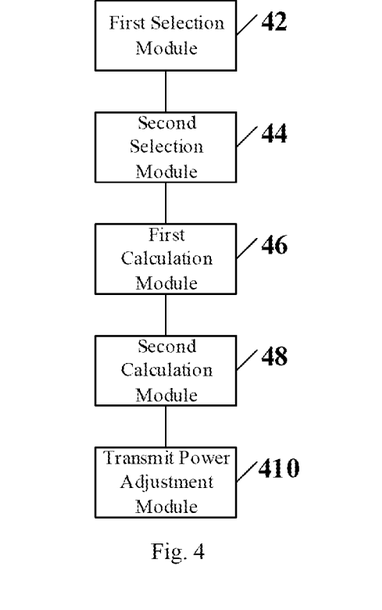
FIG. 4 is a structural diagram of an embodiment of an apparatus for adjusting transmitting power of a wireless networking system according to an embodiment of the present disclosure.

FIG. 4 is a structural diagram of a preferred embodiment of an apparatus for adjusting transmit power of a wireless networking system provided by the present disclosure. The apparatus can implement the whole process of the method for adjusting transmit power of a wireless networking system described in any of the above embodiments.

As shown in FIG. 4, the apparatus includes: a first selection module 42, which is used to select, from among all APs, N first APs with greatest degrees of interference to constitute a first set of APs; where N>0; a second selection module 44, configured to select, with each first AP of the first set of APs as the center, M second APs adjacent to the first AP to constitute a set of APs with power to be adjusted, forming N sets of APs with power to be adjusted, each of the sets of APs with power to be adjusted including M+1 APs with power to be adjusted; where M>0; a first calculation module 46, configured to acquire a first network performance parameter of a client connected under each of the APs with power to be adjusted and a second network performance parameter of each of the APs with power to be adjusted; a second calculation module 48, configured to randomly select, for each of the APs with power to be adjusted, a transmit power adjustment strategy, and calculate a third network performance parameter of the client connected under the adjusted each of the APs with power to be adjusted and a fourth network performance parameter of the adjusted each of the APs with power to be adjusted; wherein the transmit power adjustment strategy includes increasing transmit power, reducing transmit power and keeping transmit power unchanged; a transmit power adjustment module 410, configured to acquire, according to the first network performance parameter, the second network performance parameter, the third network performance parameter and/or the fourth network performance parameter, the next transmit power adjustment strategy for each of the APs with power to be adjusted.

Preferably, the first selection module 42 specifically includes: a received signal strength acquisition unit 421, configured to acquire, between any two of the APs, a signal strength value of a signal received from a client, a noise floor, a channel utilization ratio and a signal strength value of a signal received from a neighbor access point; an interference degree ranking unit 422 configured to determine, according to the signal strength value of the signal received from the client, the noise floor, the channel utilization ratio or the signal strength value of a signal received from a neighbor access point, a degree of interference of each of the APs, and rank the APs according to the degrees of interference in an order from highest to lowest; a first AP selection unit 423, configured to select, from among the ranked APs, the top N APs as the first APs.

Preferably, the apparatus further includes: a transmit power reduction module 45, configured to reduce the transmit power of each of the APs with power to be adjusted in N of the sub-areas by a preset amplitude.

Specifically, the transmit power reduction module 45 is specifically configured to: downward adjust the transmit powers of respective wireless high-rate modes corresponding to all of the APs in the selected N sub-areas by a preset amplitude, and keep the transmit powers of respective wireless low-rate modes of such APs unchanged.

Among other things, the preset amplitude is determined by the formula below:

$\Delta P = f(d)*(P_{max} - P_{min})$; where $AP$ is the preset amplitude, $f(d)$ is an adjustment factor, $0 \le f(d) \le 1$, $P_{max}$ is the maximum transmit power for $AP$, and $P_{min}$ is the minimum transmit power for $AP$.

Preferably, the transmit power adjustment strategy is identified as follows: +1 indicates increasing transmit power, −1 indicates reducing transmit power, and 0 indicates keeping transmit power unchanged.

Preferably, the first network performance parameter includes one or more of negotiation rate value, delay, packet loss rate and packet error rate; the second network performance parameter includes one or more of negotiation rate value, delay, packet loss rate and packet error rate; the third network performance parameter includes one or more of negotiation rate value, delay, packet loss rate and packet error rate; the fourth network performance parameter includes one or more of negotiation rate value, delay, packet loss rate and packet error rate.

Preferably, the transmit power adjustment module 410 specifically includes:

a first network performance improvement value calculation unit 4101, configured to: acquire, according to the third network performance parameter and the first network performance parameter, a first value of network performance improvement for each of the APs with power to be adjusted; a second network performance improvement value calculation unit 4102, configured to acquire, according to the fourth network performance parameter and the second network performance parameter, a second value of network performance improvement for each of the APs with power to be adjusted; a contribution value calculation unit 4103, configured to acquire, for each of the APs with power to be adjusted, a value of contribution by the AP to a network performance improvement for the set of APs which the AP is in according to the first value of network performance improvement and the second value of network performance improvement; a transmit power adjustment unit 4104, configured to acquire the next transmit power adjustment strategy for each of the APs with power to be adjusted according to the value of contribution.

Preferably, the transmit power adjustment unit 4104 specifically includes: a first adjustment subunit 41041, configured to set, when the value of contribution is greater than a first threshold, the next transmit power adjustment strategy to be increasing transmit power, and acquire, according to a difference between the value of contribution and the first threshold, an increased transmit power value; a second adjustment subunit 41042, configured to set, when the value of contribution is less than a second threshold, the next transmit power adjustment strategy to be reducing transmit power, and acquire, according to a difference between the second threshold and the value of contribution, a reduced transmit power value; wherein the second threshold is less than the first threshold; a third adjustment subunit 41043, configured to set, when the value of contribution is neither greater than the first threshold nor less than the second threshold, the next transmit power adjustment strategy to be keeping transmit power unchanged.

Preferably, the apparatus further includes: a power adjustment AP selection module 40, configured to select an AP for which power adjustment is to be performed.

Figure 5:
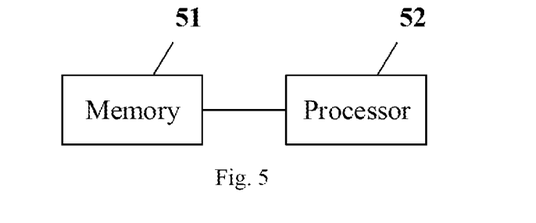
FIG. 5 is a structural diagram of an embodiment of a device for adjusting transmit power of a wireless networking system according to an embodiment of the present disclosure.

FIG. 5 is a structural diagram of a preferred embodiment of a device for adjusting transmit power of a wireless networking system provided by the present disclosure. The device can implement the whole process of the method for adjusting transmit power of a wireless networking system described in any of the above embodiments.

As shown in FIG. 5, the device includes: a memory 51 and a processor 52; wherein the memory 51 stores a computer program which, is configured to be executed by the processor 52, and which, when executed by the processor 52, implements the method for adjusting transmit power of a wireless networking system described in any of the above embodiments.

Exemplarily, the computer program may be divided into one or more modules/units, which are stored in memory 51 and executed by processor 52 so as to accomplish the present disclosure. One or more modules/units may be a series of computer program instruction segments that can accomplish specific functions, and the instruction segments are used to describe the execution process of the computer program in the device.

Processor 52 may be Central Processing Unit (CPU), or may be other general processor, Digital Signal Processor (DSP), application specific integrated circuit (ASIC), ASIC), Field-Programmable Gate Array (FPGA) or other programmable logic device, discrete gate or transistor logic device, discrete hardware component, etc. The general processor may be a microprocessor or may be any conventional processor, and so on.

Memory 51 can be used to store the computer programs and/or modules, and processor 52 can implement various functions of the device by running or executing the computer programs and/or modules stored in memory 51 and calling the data stored in the memory. The memory 51 may mainly include a storage program region and a storage data region, wherein the storage program region may store an operating system, application programs required by at least one function (such as sound playing function, image playing function, etc.), and so on, and the data storage region may store data (such as audio data, phone book, etc.) created according to the use of the mobile phone. In addition, the memory may include both high-speed random access memory and non-volatile memory, such as hard disk, internal storage, plug-in hard disk, Smart Media Card (SMC), Secure Digital (SD) card, Flash Card, at least one disk memory device, flash memory device, or other volatile solid-state memory device.

In addition, the embodiments of the present disclosure also provide a first access point (AP), which is one of constituent devices of a wireless network, and includes one or more processors configured to: select, in response to a degree of interference of the first access point satisfying a preset condition, a plurality of second access points adjacent to the first access point; determine the first access point and the plurality of second access points as constituent access points of a sub-network of the wireless network; and adjust, based on a first network performance parameter corresponding to at least one client connected to an access point of the sub-network and/or a second network performance parameter corresponding to at least one access point in the sub-network, a transmit power of the first access point. Among other things, the one or more processors may be the above described processor 52.

As an alternative, the preset condition is that among all of the constituent access points of the wireless network, the first access point is one of the top N access points with highest degrees of interference, where N>0. As an alternative, the degree of interference of the first access point is determined by a signal strength value of a signal received by the first access point from a client, a noise floor, a channel utilization ratio, and a signal strength value of a signal received from a neighbor access point. As yet another alternative, the preset condition may also be that: the first AP is an AP capable of power adjustment. For example, assuming that the APs constituting the wireless network include both those that only support versions of protocols preceding WiFi 6 and those that support WiFi 6 and the versions following WiFi 6. That is, the wireless network may be a hybrid networking wireless network at this point. Then, if the first access point is an AP that supports the versions following WiFi 6 and still suffers from a strong degree of interference, the first access point may be configured to perform the subsequent power adjustment steps. Of course, the present disclosure is not limited to this.

In one example, the first access point receives a channel scanning instruction from a certain network node (e.g., central manager or FAP) in the wireless network, then the first access point performs a channel scanning operation, and then returns scanning information of current channel (including a channel value and a signal strength value) to the network node which sent out the command. After receiving the scanning information, the network node selects therefrom N APs with greatest degrees of interference. At this point, the network node of the wireless network may determine that the first access point is one of the N APs with greatest degrees of interference. In one example, the wireless networking system has X APs, of which the first access point is the ith AP. The scanning information of the current channel of the first access point is a set of $\{RSSI_{i,1}, RSSI_{i,2}, \ldots, RSSI_{i,j}\}$, where j is a number of neighbors that can be scanned by the first AP, then a degree of interference of the first AP is calculated according to the formula as follows:

$$\text{noise}_i = \sum_j f(RSSI_{i,j})$$

and $\text{noise}_i$ is ranked from largest to smallest by the network node which sent out the command, and the AP with the largest noise value is considered as the AP with the greatest interference.

The first access point may obtain the first network performance parameter or the second network performance parameter from the network node, the respective APs in the sub-network and the respective clients connected to the sub-network as described above. Alternatively, the first access point may also measure the second network performance parameter. Of course, the present disclosure is not limited to this.

As an example, assuming that before power adjustment, corresponding to all of the clients connected to the sub-network, the set of negotiation rates is $\text{ratei}_{pre}$, the set of delays is $\text{delayi}_{pre}$, the set of packet loss rates is $\text{dropi}_{pre}$, and the first network performance parameter corresponding to at least one client connected to the access point of the sub-network can be expressed as a function of $[\text{ratei}_{pre}, \text{delayi}_{pre}, \text{dropi}_{pre}]$. For example, the first network performance parameter may be the maximum, minimum, median or average of the set of negotiation rates $\text{ratei}_{pre}$. The first network performance parameter may also be the maximum, minimum, median or average of the set of delays $\text{delayi}_{pre}$. The first network performance parameter may also be the maximum, minimum, median or average of the set of packet loss rates $\text{dropi}_{pre}$. Alternatively, the first network performance parameter may also be a weighted average of the negotiation rate $\text{ratei}_{pre}^j$, the delay $\text{delayi}_{pre}^j$ and the packet loss rate $\text{dropi}_{pre}^j$ of the jth client connected to the sub-network, where the jth client may be any of the clients connected to the sub-network, or the client with the worst quality of channel, and so on.

In another aspect, before power adjustment, corresponding to all of the access points in the sub-network, the set of negotiation rates is $\text{raten}_{pre}$, the set of delays is $\text{delayn}_{pre}$, and the set of packet loss rates is $\text{dropn}_{pre}$, and the second network performance parameter corresponding to at least one access point in the sub-network can be expressed as a function of $[\text{raten}_{pre}, \text{delayn}_{pre}, \text{droph}_{pre}]$. For example, the second network performance parameter may be the maximum, minimum, median or average of the set of negotiation rates $\text{raten}_{pre}$. The second network performance parameter may also be the maximum, minimum, median or average of the set of delays $\text{delayn}_{pre}$. The second network performance parameter may also be the maximum, minimum, median, or average of the set of packet loss rates $\text{dropn}_{pre}$. Alternatively, the second network performance parameter may also be a weighted average of the negotiation rate $\text{raten}_{pre}^j$, the delay $\text{delayn}_{pre}^j$ and the packet loss rate $\text{dropn}_{pre}^j$ of the j-th access point connected to the sub-network, where the j-th access point may be the first access point, or the access point farthest from the first access point, or the access point closest to the first access point, and so on.

As an alternative, the adjusting of the transmit power of the first access point includes: randomly adjusting the transmit power of the first access point, the randomly adjusting including: increasing the transmit power of the first access point, reducing the transmit power of the first access point, and maintaining the transmit power of the first access point.

As an alternative, the first access point further includes: a transmitter, configured to send, to the plurality of second access points, a power adjustment instruction instructing the plurality of second access points to adjust transmit power. Specifically, if the transmit power of the first access point is reduced, the power adjustment instruction may instruct each of the plurality of second access points to reduce the transmit power. If the transmit power of the first access point is increased, the power adjustment instruction may instruct each of the plurality of second access points to increase the transmit power. Of course, the present disclosure is not limited to this.

As another alternative, the transmit powers of all of the access points in the sub-network including the first access point may be reduced. At this point, the first access point may determine an amplitude by which its transmit power is reduced by the formula below: $\Delta P=f(d)*(P_{max}-P_{min})$; where $\Delta P$ is the preset amplitude, $f(d)$ is an adjustment factor, $0 \leq f(d) \leq 1$, $P_{max}$ is the maximum transmit power for AP, and $P_{min}$ is the minimum transmit power for AP. Optionally, the value of $f(d)$ is non-linearly variable, and may vary according to the maximum transmit power and the minimum transmit power for the first AP, so that the adjusted power value is not at the edge at the beginning, which facilitates the iterative power adjustment process better.

As another alternative, the transmit power of the first access point may be adjusted according to a mode of rate at which the first access point sends a certain data packet. As described above, the first access point can send a data packet in both wireless high-rate mode and wireless low-rate mode. Specifically, in response to the first access point sending a data packet in a wireless high-rate mode, the transmit power with which the first access point sends the data packet is reduced; and in response to the first access point sending a data packet in a wireless low-rate mode, the transmit power with which the first access point sends the data packet is maintained. Of course, the present disclosure is not limited to this.

As another alternative, the transmit powers of all of the access points in the sub-network including the first access point may be increased. Of course, the present disclosure is not limited to this.

As another alternative, the power adjustment scheme of the first access point is determined by an upper layer command from the above network node (e.g., central manager or FAP). For example, the network node may send the following transmit power adjustment identifier to the first access point, in which +1 indicates increasing transmit power, −1 indicates reducing transmit power, and 0 indicates keeping transmit power unchanged.

As another alternative, the power adjustment scheme of the first access point may be determined by combining the above upper layer command and the wireless rate mode of the first access point. Both the power by which the first access point possibly increases and the power by which the first access point possibly reduces need to be calculated in correspondence to respective wireless rate modes. The power value by which the first access point increases or reduces can be characterized by the formula below: $d_i=f(P_{level})$. The first access point may calculate a degree by which the power needs to be adjusted according to different power levels $P_{level}$, that is, the adjusted power value is: $P_i \leftarrow P_{0,i}-d_i$. Optionally, $f(P_{level})$ is a nonlinear function.

As an alternative, the adjusting of the transmit power of the first access point includes: acquiring, after adjusting the transmit power of the first access point, a third network performance parameter corresponding to at least one client connected to an access point of the sub-network and/or a fourth network performance parameter corresponding to at least one access point in the sub-network; and re-adjusting, based on the third network performance parameter and/or the fourth network performance parameter, the transmit power of the first access point.

The first access point may acquire the third network performance parameter or the fourth network performance parameter from the network node, the respective APs in the sub-network and the respective clients connected to the sub-network as described above. Alternatively, the first access point may also measure the fourth network performance parameter. Of course, the present disclosure is not limited to this.

As an example, assuming that after power adjustment, corresponding to all of the clients connected to the sub-network, the set of negotiation rates is $ratei_{cur}$, the set of delays is $delayi_{cur}$, the set of packet loss rates is $dropi_{cur}$, and the third network performance parameter corresponding to at least one client connected to the access point of the sub-network can be expressed as a function of [$ratei_{cur}$, $delayi_{cur}$, $dropi_{cur}$]. The way to calculate the third network performance parameter is the same as or similar to that in terms of the first network performance parameter, which will not be detailed here. After power adjustment, corresponding to all of the access points of the sub-network, the set of negotiation rates is $raten_{cur}$, the set of delays is $delayn_{cur}$, and the set of packet loss rates is $dropn_{cur}$, then the fourth network performance parameter corresponding to at least one access point in the sub-network can be expressed as [$raten_{cur}$, $delayn_{cur}$, $dropn_{cur}$]. The way to calculate the fourth network performance parameter is the same as or similar to that in terms of the second network performance parameter, which will not be detailed here.

As an alternative, the re-adjusting, based on the third network performance parameter and/or the fourth network performance parameter, the transmit power of the first access point includes: determining, based on the first network performance parameter and the third network performance parameter, a first network performance comparison value; determining, based on the second network performance parameter and the fourth network performance parameter, a second network performance comparison value; and determining, based on the first network performance comparison value and the second network performance comparison value, a value of contribution by a transmit power adjustment of the first access point to a network performance improvement of the sub-network, and re-adjusting, based on the value of contribution, the transmit power of the first access point.

As an example, the first network performance comparison value can be calculated as $Ps=f(ratei_{pre}, ratei_{cur}, delayi_{pre}, delayi_{cur}, dropi_{pre}, dropi_{cur})$, and the second network performance comparison value can be calculated as $Pa=g(raten_{pre}, raten_{cur}, delayn_{pre}, delayn_{cur}, dropn_{pre}, dropn_{cur})$. According to Ps and Pa, a value of contribution by the first access point to the network performance improvement of the set of APs with power to be adjusted where the first access point is in can be further calculated as $Q=h(Ps, Pa)$. Then, the next transmit power adjustment strategy of the first access point is set to +1 or −1 or 0 according to the value of Q. Here, f, g and h are all linear or nonlinear functions, and the specific forms of f, g and h are not limited in the present disclosure.

As an alternative, the re-adjusting, based on the value of contribution, the transmit power of the first access point includes: increasing, in response to the value of contribution being greater than a first threshold, the transmit power of the first access point based on a difference between the value of contribution and the first threshold; reducing, in response to the value of contribution being less than a second threshold, the transmit power of the first access point based on a difference between the value of contribution and the second threshold, wherein the second threshold is less than the first threshold; and maintaining, in response to the value of contribution being neither greater than the first threshold nor less than the second threshold, the transmit power of the first access point.

Specifically, the value of contribution may be graded, and the scheme of re-adjustment of transmit power by the first access point may be set according to its grade. For example, it is characterized by the formula below:

$$T = \begin{cases} +1, & Q > \mu 1 \\ 0, & \mu 2 \leq Q \leq \mu 1 \\ -1, & Q < \mu 2 \end{cases}$$

that is, when T=+1, the first access point increases the transmit power, and when T=0, the first access point maintains the transmit power, and when T=−1, the first access point reduces the transmit power, where µ1 is the first threshold, and µ2 is the second threshold. Of course, the present disclosure is not limited to this.

In addition, an embodiment of the present disclosure provides a second access point (AP), which is one of constituent devices of a wireless network, and includes one or more processors configured to: determine, in response to a degree of interference of a first access point adjacent to the second access point satisfying a preset condition, that the second access point is an access point in a sub-network with the first access point as the center; and adjust, based on a first network performance parameter corresponding to at least one client connected to an access point of the sub-network and/or a second network performance parameter corresponding to at least one access point in the sub-network, a transmit power of the second access point. For example, the second access point (AP) may receive, from the first access point or the above network node (central manager or FAB), an instruction indicating that it is one of the access points constituting the sub-network with the first access point as the center.

As an alternative, the adjusting of the transmit power of the second access point includes: acquiring, after adjusting the transmit power of the second access point, a third network performance parameter corresponding to at least one client connected to an access point of the sub-network and/or a fourth network performance parameter corresponding to at least one access point in the sub-network; and re-adjusting, based on the third network performance parameter and/or the fourth network performance parameter, the transmit power of the second access point.

As an alternative, the re-adjusting, based on the third network performance parameter and/or the fourth network performance parameter, the transmit power of the first access point includes: determining, based on the first network performance parameter and the third network performance parameter, a first network performance comparison value; determining, based on the second network performance parameter and the fourth network performance parameter, a second network performance comparison value; and determining, based on the first network performance comparison value and/or the second network performance comparison value, a value of contribution by a transmit power adjustment of the first access point to a network performance improvement of the sub-network, and re-adjusting, based on the value of contribution, the transmit power of the second access point.

In addition, an embodiment of the present disclosure provides a method performed by a wireless network, including: selecting, from among all of APs constituting the wireless network, N first APs with greatest degrees of interference to constitute a first set of APs; where N>0; selecting, with each first AP of the first set of APs as the center, M second APs adjacent to the first AP to form N sub-networks, each of which includes one first AP and M second APs; where M>0; acquiring, for one of the N sub-networks, a first network performance parameter corresponding to a client connected to an AP in the sub-network and/or a second network performance parameter corresponding to the AP in the sub-network; randomly selecting a transmit power adjustment strategy corresponding to the AP in the sub-network, and adjusting, based on the transmit power adjustment strategy, a transmit power corresponding to the AP in the sub-network, wherein the transmit power adjustment strategy includes increasing transmit power, reducing transmit power and keeping transmit power unchanged; calculating a third network performance parameter of the client connected with the adjusted AP in the sub-network and a fourth network performance parameter corresponding to the adjusted AP in the sub-network; and acquiring, according to the first network performance parameter, the second network performance parameter, the third network performance parameter and/or the fourth network performance parameter, the next transmit power adjustment strategy for the AP in the sub-network.

As an alternative, the acquiring, according to the first network performance parameter, the second network performance parameter, the third network performance parameter and/or the fourth network performance parameter, the next transmit power adjustment strategy for the AP in the sub-network includes: acquiring, according to the third network performance parameter and the first network performance parameter, a first value of network performance improvement of an AP in each of the sub-networks; acquiring, according to the fourth network performance parameter and the second network performance parameter, a second value of network performance improvement of the sub-network; acquiring, according to the first value of network performance improvement and the second value of network performance improvement, a value of contribution by the AP in the sub-network to a network performance improvement of the sub-network; and acquiring, according to the value of contribution, the next transmit power adjustment strategy for the AP in the sub-network.

As an alternative, the acquiring the next transmit power adjustment strategy for the AP in the sub-network according to the value of contribution including: setting, when the value of contribution is greater than a first threshold, the next transmit power adjustment strategy to be increasing transmit power, and acquiring, according to a difference between the value of contribution and the first threshold, an increased transmit power value; setting, when the value of contribution is less than a second threshold, the next transmit power adjustment strategy to be reducing transmit power, and acquiring, according to a difference between the second threshold and the value of contribution, a reduced transmit power value; wherein the second threshold is less than the first threshold; and setting, when the value of contribution is neither greater than the first threshold nor less than the second threshold, the next transmit power adjustment strategy to be keeping transmit power unchanged.

As an alternative, the selecting, from among all APs, N first APs with greatest degrees of interference to constitute a first set of APs includes: acquiring, between any two of the APs, a signal strength value of a signal received from a client, a noise floor, a channel utilization ratio and a signal strength value of a signal received from a neighbor access point; determining, according to the signal strength value of the signal received from the client, the noise floor, the channel utilization ratio or the signal strength value of a signal received from a neighbor access point, a degree of interference of each of the APs, and ranking the APs according to the degrees of interference in an order from highest to lowest; and selecting, from among the ranked APs, the top N APs as the first APs.

As an alternative, after the forming N sub-networks, the method further includes: reducing transmit powers of APs in each of the N sub-networks by a preset amplitude.

As an alternative, the preset amplitude is determined by the formula below: $\Delta P=f(d)*(P_{max}-P_{min})$; where $\Delta P$ is the preset amplitude, $f(d)$ is an adjustment factor, $0 \le f(d) \le 1$, $P_{max}$ is the maximum transmit power for AP, and $P_{min}$ is the minimum transmit power for AP.

In addition, an embodiment of the present disclosure provides a first access point (AP), which, together with a plurality of second access points, constitutes a sub-network of a wireless network, and includes one or more processors configured to: randomly adjust, based on a first network performance parameter corresponding to at least one client connected to an access point of the sub-network and/or a second network performance parameter corresponding to at least one access point in the sub-network, the transmit power of the first access point; acquiring, after adjusting the transmit power of the first access point, a third network performance parameter corresponding to at least one client connected to an access point of the sub-network and/or a fourth network performance parameter corresponding to at least one access point in the sub-network; and re-adjust, based on the third network performance parameter and/or the fourth network performance parameter, the transmit power of the first access point.

For example, the first access point receives a channel scanning instruction from a certain network node (e.g., central manager or FAP) in the wireless network, then the first access point performs a channel scanning operation, and then returns scanning information of current channel (including a channel value and a signal strength value) to the network node which sent out the command. The scanning information may include the first network performance parameter corresponding to at least one client connected to the access point in the sub-network and/or the second network performance parameter corresponding to at least one access point in the sub-network as described above. The network node may send, to the first access point, a command to randomly adjust the transmit power of the first access point. For example, the network node may send, to the first access point, the following command including the transmit power adjustment identifier, where +1 indicates increasing transmit power, −1 indicates reducing transmit power, and 0 indicates keeping transmit power unchanged.

Next, after adjusting its transmit power according to the above instruction, the first access point will re-perform the channel scanning operation, and then return the scanning information (including a channel value and a signal strength value) of this channel to the network node which sent out the command. At this point, the scanning information may include the third network performance parameter corresponding to at least one client connected to an access point of the sub-network and/or the fourth network performance parameter corresponding to at least one access point in the sub-network as described above.

After receiving the above third and fourth network performance parameters, the network node may send, to the first access point, a command to re-adjust the transmit power of the first access point.

As an alternative, the re-adjusting, based on the third network performance parameter and/or the fourth network performance parameter, the transmit power of the first access point includes: determining, based on the first network performance parameter and the third network performance parameter, a first network performance comparison value; determining, based on the second network performance parameter and the fourth network performance parameter, a second network performance comparison value; and determining, based on the first network performance comparison value and the second network performance comparison value, a value of contribution by a transmit power adjustment of the first access point to a network performance improvement of the sub-network, and re-adjusting, based on the value of contribution, the transmit power of the first access point.

A method for adjusting transmit power of a wireless networking system provided by the embodiments of the present disclosure, by firstly randomly adjusting transmit powers of APs whose signals are interfered, dynamically calculating, according to information of a client connected to APs within the wireless networking system, a degree of influence by each of the APs on the network performance of the area where it is located, and subsequently adjusting the transmit power according to the degree of influence, enables each of the APs in the wireless networking system to operate in a globally optimal state, thereby reducing the signal interference of the wireless networking system and improving the network performance of the wireless networking system.

It should be noted that the above device for adjusting transmit power of a wireless networking system includes, but is not limited to, a processor and a memory. It can be understood by those skilled in the art that the structural diagram in FIG. 3 is merely an example of the above device for adjusting transmit power of a wireless networking system, does not constitute a limitation on the device for adjusting transmit power of a wireless networking system, and may include more components than those shown, or combine certain components or different components.

What is described above is only the preferred embodiments of the present disclosure, but the protection scope of the present disclosure is not limited to this. It should be pointed out that for those skilled in the art, several equivalent obvious variants and/or equivalent substitutions can be made without departing from the technical principles of the present disclosure, and such obvious variants and/or equivalent substitutions should also be regarded as the protection scope of the present disclosure.

The invention claimed is:

1. A first access point (AP), which is one of constituent devices of a wireless network, and comprises one or more processors configured to:
   select, in response to a degree of interference of the first access point satisfying a preset condition, a plurality of second access points adjacent to the first access point;
   determine the first access point and the plurality of second access points as constituent access points of a sub-network of the wireless network; and
   adjust, based on a first network performance parameter corresponding to at least one client connected to an access point of the sub-network and/or a second network performance parameter corresponding to at least one access point in the sub-network, a transmit power of the first access point.

2. The first access point according to claim 1, wherein the preset condition is that among all of the constituent access points of the wireless network, the first access point is one of the top N access points with highest degrees of interference, where N>0.

3. The first access point according to claim 1, wherein the degree of interference of the first access point is determined by at least one of a signal strength value of a signal received by the first access point from a client, a noise floor, a channel utilization ratio, and a signal strength value of a signal received from a neighbor access point.

4. The first access point according to claim 1, wherein the first access point further comprises: a transmitter, configured to send, to the plurality of second access points, a power adjustment instruction instructing the plurality of second access points to adjust transmit power.

5. The first access point according to claim 1, wherein the adjusting of the transmit power of the first access point comprises:
   acquiring, after adjusting the transmit power of the first access point, a third network performance parameter corresponding to at least one client connected to an access point of the sub-network and/or a fourth network performance parameter corresponding to at least one access point in the sub-network; and
   re-adjusting, based on the third network performance parameter and/or the fourth network performance parameter, the transmit power of the first access point.

6. The first access point according to claim 1, wherein the adjusting of the transmit power of the first access point comprises:
   reducing, in response to the first access point sending a data packet in a wireless high-rate mode, the transmit power with which the first access point sends the data packet; and
   maintaining, in response to the first access point sending a data packet in a wireless low-rate mode, the transmit power with which the first access point sends the data packet.

7. The first access point according to claim 5, wherein the re-adjusting, based on the third network performance parameter and/or the fourth network performance parameter, the transmit power of the first access point comprises:
   determining, based on the first network performance parameter and the third network performance parameter, a first network performance comparison value; and/or determining, based on the second network performance parameter and the fourth network performance parameter, a second network performance comparison value; and
   determining, based on the first network performance comparison value and/or the second network performance comparison value, a value of contribution by a transmit power adjustment of the first access point to a network performance improvement of the sub-network, and
   re-adjusting, based on the value of contribution, the transmit power of the first access point.

8. The first access point according to claim 7, wherein the re-adjusting, based on the value of contribution, the transmit power of the first access point comprises:
   increasing, in response to the value of contribution being greater than a first threshold, the transmit power of the first access point based on a difference between the value of contribution and the first threshold;
   reducing, in response to the value of contribution being less than a second threshold, the transmit power of the first access point based on a difference between the value of contribution and the second threshold, wherein the second threshold is less than the first threshold; and
   maintaining, in response to the value of contribution being neither greater than the first threshold nor less than the second threshold, the transmit power of the first access point.

9. The first access point according to claim 5, wherein,
   the first network performance parameter includes one or more of negotiation rate value, delay, packet loss rate and packet error rate corresponding to at least one client connected to an access point in the sub-network;
   the second network performance parameter includes one or more of negotiation rate value, delay, packet loss rate and packet error rate corresponding to at least one access point in the sub-network;
   the third network performance parameter includes one or more of negotiation rate value, delay, packet loss rate and packet error rate corresponding to at least one client connected to the power adjusted access point in the sub-network; and
   the fourth network performance parameter includes one or more of negotiation rate value, delay, packet loss rate and packet error rate corresponding to at least one access point in power adjusted the sub-network.

10. A first access point (AP), which, together with a plurality of second access points, constitutes a sub-network of a wireless network, and comprises one or more processors configured to:
    randomly adjust, based on a first network performance parameter corresponding to at least one client connected to an access point of the sub-network and/or a second network performance parameter corresponding to at least one access point in the sub-network, a transmit power of the first access point;
    acquire, after adjusting the transmit power of the first access point, a third network performance parameter corresponding to at least one client connected to an access point of the sub-network and/or a fourth network performance parameter corresponding to at least one access point in the sub-network; and
    re-adjust, based on the third network performance parameter and/or the fourth network performance parameter, the transmit power of the first access point.

11. The first access point according to claim 10, wherein the re-adjusting, based on the third network performance parameter and/or the fourth network performance parameter, the transmit power of the first access point comprises:
    determining, based on the first network performance parameter and the third network performance parameter, a first network performance comparison value; and/or determining, based on the second network performance parameter and the fourth network performance parameter, a second network performance comparison value; and
    determining, based on the first network performance comparison value and/or the second network performance comparison value, a value of contribution by a transmit power adjustment of the first access point to a network performance improvement of the sub-network, and
    re-adjusting, based on the value of contribution, the transmit power of the first access point.

12. The first access point according to claim 11, wherein the re-adjusting, based on the value of contribution, the transmit power of the first access point comprises:
increasing, in response to the value of contribution being greater than a first threshold, the transmit power of the first access point based on a difference between the value of contribution and the first threshold;
reducing, in response to the value of contribution being less than a second threshold, the transmit power of the first access point based on a difference between the value of contribution and the second threshold, wherein the second threshold is less than the first threshold; and
maintaining, in response to the value of contribution being neither greater than the first threshold nor less than the second threshold, the transmit power of the first access point.

13. A method performed by a wireless network, comprising:
selecting, from among all of APs constituting the wireless network, N first APs with greatest degrees of interference to constitute a first set of APs; where N>0;
selecting, with each first AP of the first set of APs as the center, M second APs adjacent to the first AP to form N sub-networks, each of which includes one first AP and M second APs; where M>0;
for one of the N sub-networks:
acquiring, a first network performance parameter corresponding to at least one client connected to an AP in the sub-network and/or a second network performance parameter corresponding to at least one AP in the sub-network;
randomly selecting a transmit power adjustment strategy corresponding to the AP in the sub-network, and adjusting, based on the transmit power adjustment strategy, a transmit power corresponding to the AP in the sub-network, wherein the transmit power adjustment strategy includes increasing transmit power, reducing transmit power and keeping transmit power unchanged;
calculating a third network performance parameter of the at least one client connected with the adjusted AP in the sub-network and a fourth network performance parameter corresponding to the adjusted at least one AP in the sub-network; and
acquiring, according to the first network performance parameter, the second network performance parameter, the third network performance parameter and/or the fourth network performance parameter, the next transmit power adjustment strategy for the AP in the sub-network.

14. The method according to claim 13, wherein the acquiring, according to the first network performance parameter, the second network performance parameter, the third network performance parameter and/or the fourth network performance parameter, the next transmit power adjustment strategy for the AP in the sub-network comprises:
acquiring, according to the third network performance parameter and the first network performance parameter, a first value of network performance improvement of an AP in each of the sub-networks; and/or acquiring, according to the fourth network performance parameter and the second network performance parameter, a second value of network performance improvement of the sub-network;
acquiring, according to the first value of network performance improvement and/or the second value of network performance improvement, a value of contribution by the AP in the sub-network to a network performance improvement of the sub-network; and
acquiring, according to the value of contribution, the next transmit power adjustment strategy for the AP in the sub-network.

15. The method according to claim 14, wherein the acquiring the next transmit power adjustment strategy for the AP in the sub-network according to the value of contribution comprises:
setting, when the value of contribution is greater than a first threshold, the next transmit power adjustment strategy to be increasing transmit power, and acquiring, according to a difference between the value of contribution and the first threshold, an increased transmit power value;
setting, when the value of contribution is less than a second threshold, the next transmit power adjustment strategy to be reducing transmit power, and acquiring, according to a difference between the second threshold and the value of contribution, a reduced transmit power value;
wherein the second threshold is less than the first threshold; and
setting, when the value of contribution is neither greater than the first threshold nor less than the second threshold, the next transmit power adjustment strategy to be keeping transmit power unchanged.

16. The method according to claim 13, wherein the selecting, from among all APs, N first APs with greatest degrees of interference to constitute a first set of APs comprises:
acquiring, from any two of the APs, a signal strength value of a signal received from a client, a noise floor, a channel utilization ratio and a signal strength value of a signal received from a neighbor access point;
determining, according to the signal strength value of the signal received from the client, the noise floor, the channel utilization ratio or the signal strength value of a signal received from a neighbor access point, a degree of interference of each of the APs, and ranking the APs according to the degrees of interference in an order from highest to lowest; and
selecting, from among the ranked APs, the top N APs as the first APs.

17. The method according to claim 13, wherein after the forming N sub-networks, the method further comprises:
reducing transmit powers of APs in each of the N sub-networks by a preset amplitude.

18. The method according to claim 17, wherein the preset amplitude is determined by the formula below:

$$\Delta P = f(d)*(P_{max}-P_{min});$$ where $\Delta P$ is the preset amplitude, $f(d)$ is an adjustment factor, $0 \leq f(d) \leq 1$, $P_{max}$ is the maximum transmit power for $AP$, and $P_{min}$ is the minimum transmit power for $AP$.

19. A non-transitory computer-readable storage medium, wherein the computer-readable storage medium stores computer program which, when executed, implements the method according to claim 12.

* * * * *